(12) United States Patent
Sutherland

(10) Patent No.: US 11,392,797 B2
(45) Date of Patent: Jul. 19, 2022

(54) METHOD, APPARATUS, AND SYSTEM FOR FILTERING IMAGERY TO TRAIN A FEATURE DETECTION MODEL

(71) Applicant: HERE GLOBAL B.V., Eindhoven (NL)

(72) Inventor: Alastair B. Sutherland, Seattle, WA (US)

(73) Assignee: HERE Global B.V., Eindhoven (NL)

( * ) Notice: Subject to any disclaimer, the term of this patent is extended or adjusted under 35 U.S.C. 154(b) by 250 days.

(21) Appl. No.: 16/779,125

(22) Filed: Jan. 31, 2020

(65) Prior Publication Data
US 2021/0241035 A1 Aug. 5, 2021

(51) Int. Cl.
G06K 9/00 (2022.01)
G06K 9/62 (2022.01)
G06V 10/32 (2022.01)

(52) U.S. Cl.
CPC .......... G06K 9/6257 (2013.01); G06K 9/623 (2013.01); G06K 9/6253 (2013.01); G06K 9/6267 (2013.01); G06V 10/32 (2022.01)

(58) Field of Classification Search
CPC ......... G06K 2209/01; G06K 2209/011; G06K 9/00422; G06K 9/4628; G06K 9/6212; G06K 9/00859; G06K 9/4671; G06K 9/6256; G06K 9/00194; G06K 9/00409; G06K 9/00416; G06K 9/00879; G06K 9/3283; G06K 9/42; G06K 9/4642; G06T 2207/30048; G06T 7/0012;
(Continued)

(56) References Cited

U.S. PATENT DOCUMENTS 7,133,546 B2 11/2006 Dehmeshki et al.
7,856,380 B1 12/2010 Latin-Stoermer et al.
(Continued)

FOREIGN PATENT DOCUMENTS

WO 2017201540 A1 11/2017

OTHER PUBLICATIONS

Ghosal et al., "A Weakly Supervised Deep Learning Framework for Sorghum Head Detection and Counting", Research Article, Plant Phenomics, vol. 2019, Article ID 1525874, published Jun. 27, 2019, retrieved on Jan. 15, 2020 from https://spj.sciencemag.org/plantphenomics/2019/1525874/, pp. 1-14.
(Continued)

*Primary Examiner* — Alex Kok S Liew
(74) *Attorney, Agent, or Firm* — Ditthavong, Steiner & Mlotkowski

(57) ABSTRACT

An approach is provided for filtering imagery to train a feature detection model. The approach involves, for example, receiving a plurality of images. The plurality of images is classified as depicting a feature of interest. The approach also involves providing data for presenting a bulk arrangement of at least one subset of the plurality of images, wherein the bulk arrangement is based on a characteristic of the plurality of images (e.g., detection confidence, position, size, visual characteristic, etc. of the detected feature). The approach further involves initiating a filtering of the plurality of images based on the bulk arrangement and providing the filtered plurality of images as training data to train the feature detection model.

20 Claims, 14 Drawing Sheets

(58) Field of Classification Search
CPC . G06T 2207/10088; G06T 2207/20116; G06T 7/11; G06T 7/12; G06T 7/149; G06T 15/20; G06T 2200/04
See application file for complete search history.

(56) References Cited

U.S. PATENT DOCUMENTS

| | | | |
|---|---|---|---|
| 9,639,806 B2 | 5/2017 | Zhang et al. | |
| 2002/0164077 A1* | 11/2002 | Lee | G06K 9/4604 |
| | | | 382/224 |
| 2012/0219211 A1* | 8/2012 | Ding | G06K 9/4642 |
| | | | 382/159 |
| 2018/0189610 A1 | 7/2018 | Kandemir et al. | |

OTHER PUBLICATIONS

Russakovsky et al., "Best of Both Worlds: Human-machine Collaboration for Object Annotation", Published in: computer vision and pattern recognition, 2015, retrieved on Jan. 15, 2020 from http://ai.stanford.edu/~olga/papers/RussakovskyCVPR15.pdf, pp. 1-11.
Su et al., "Scalable Deep Learning Logo Detection", Apr. 2, 2018, retrieved on Jan. 15, 2020 from https://arxiv.org/pdf/1803.11417.pdf, pp. 1-10.

\* cited by examiner

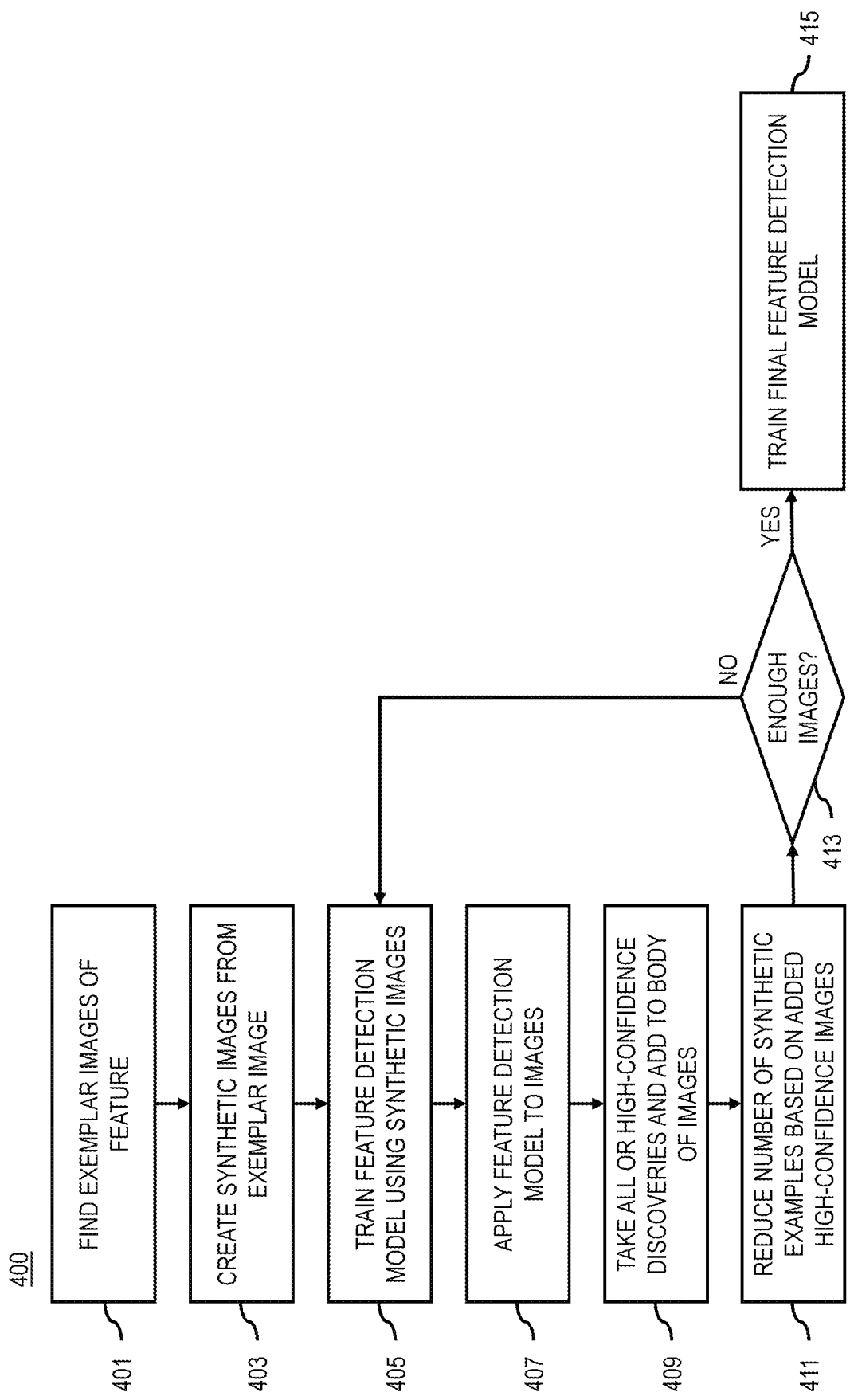

METHOD, APPARATUS, AND SYSTEM FOR FILTERING IMAGERY TO TRAIN A FEATURE DETECTION MODEL

BACKGROUND

Over the past decades, massive increases in the scale and type of annotated data have accelerated advances in all areas of machine learning. This has enabled major advances is many areas of science and technology, as complex models of physical phenomena or user behavior, with millions or perhaps billions of parameters, can be fit to data sets of increasing size. The process of annotating observations (e.g., images) to train machine learning models (e.g., a feature detection model for detecting features or objects in images) is often the most time-consuming and expensive part of the machine learning pipeline, as it requires human input for each observation, which can number in the hundreds of thousands to millions. Accordingly, service providers face significant technical challenges to enable efficient annotation and filtering of images or other observations that are to be included in training data sets for machine learning to improve feature detection accuracy.

SOME EXAMPLE EMBODIMENTS

Therefore, there is a need for an approach for filtering imagery to train a feature detection model.

According to one embodiment, a computer-implemented method comprises receiving a plurality of images, wherein the plurality of images is classified as depicting a feature of interest. The method also comprises providing data for presenting a bulk arrangement of at least one subset of the plurality of images. The bulk arrangement is based on a characteristic of the plurality of images (e.g., detection confidence, position, size, visual characteristic, etc. of the detected feature). The method further comprises initiating a filtering of the plurality of images based on the bulk arrangement. The method further comprises providing the filtered plurality of images as training data to train the feature detection model.

According to another embodiment, an apparatus comprises at least one processor, and at least one memory including computer program code for one or more computer programs, the at least one memory and the computer program code configured to, with the at least one processor, cause, at least in part, the apparatus to receive a plurality of images. The plurality of images is classified as depicting a feature of interest. The apparatus is also caused to provide data for presenting a bulk arrangement of at least one subset of the plurality of images, wherein the bulk arrangement is based on a characteristic of the plurality of images (e.g., detection confidence, position, size, visual characteristic, etc. of the detected feature). The apparatus is further caused to initiate a filtering of the plurality of images based on the bulk arrangement. The apparatus is further caused to provide the filtered plurality of images as training data to train the feature detection model.

According to another embodiment, a non-transitory computer-readable storage medium carries one or more sequences of one or more instructions which, when executed by one or more processors, cause, at least in part, an apparatus to receive a plurality of images. The plurality of images is classified as depicting a feature of interest. The apparatus is also caused to provide data for presenting a bulk arrangement of at least one subset of the plurality of images, wherein the bulk arrangement is based on a characteristic of the plurality of images (e.g., detection confidence, position, size, visual characteristic, etc. of the detected feature). The apparatus is further caused to initiate a filtering of the plurality of images based on the bulk arrangement. The apparatus is further caused to provide the filtered plurality of images as training data to train the feature detection model.

According to another embodiment, an apparatus comprises means for receiving a plurality of images, wherein the plurality of images is classified as depicting a feature of interest. The apparatus also comprises means for providing data for presenting a bulk arrangement of at least one subset of the plurality of images. The bulk arrangement is based on a characteristic of the plurality of images (e.g., detection confidence, position, size, visual characteristic, etc. of the detected feature). The apparatus further comprises means for initiating a filtering of the plurality of images based on the bulk arrangement. The apparatus further comprises means for providing the filtered plurality of images as training data to train the feature detection model.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a flowchart of an example machine learning pipeline that uses synthetic imagery, according to one embodiment;

DESCRIPTION OF SOME EMBODIMENTS

Examples of a method, apparatus, and computer program for filtering imagery to train a feature detection model are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
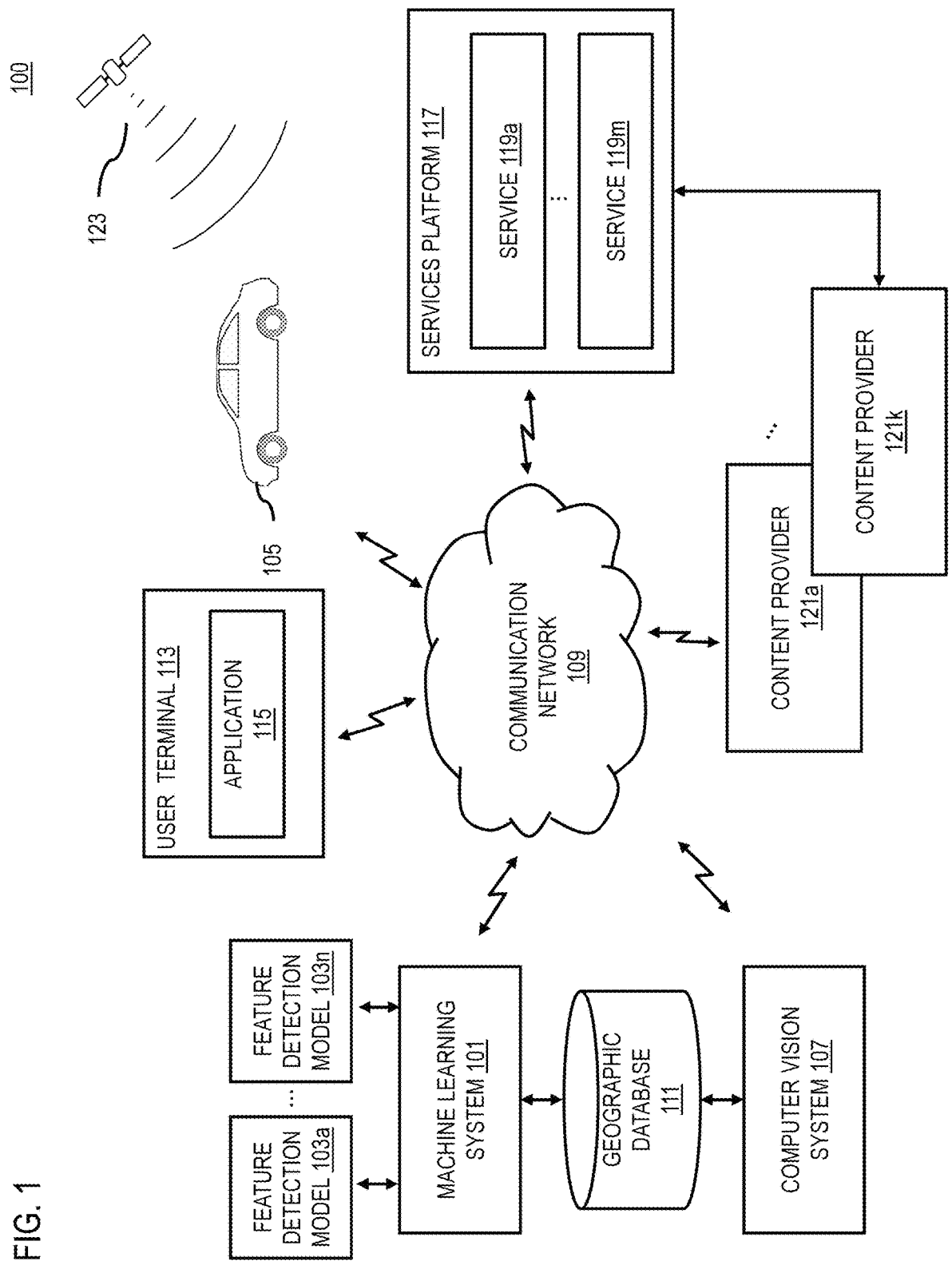
FIG. 1 is a diagram of a system capable of filtering imagery to train a feature detection model, according to one embodiment.

FIG. 1 is a diagram of a system capable of filtering imagery to train a feature detection model, according to one embodiment. As noted above, training a machine learning model generally requires a large set of annotated observations. In one embodiment, annotated observations can be data records or files representing or recording observations of a phenomenon that have been manually labeled with features or characteristics identified by an observer. For example, when training a machine learning model (e.g., a feature detection model) to detect objects or features depicted in images, an annotated observation can be an image that has been labeled with the objects or features as identified by a human labeler as being depicted in the corresponding image. Generally, a large number of such labeled observations or imagery is needed to train a feature detection model to achieve target levels of detection accuracy. In other words, a model which has only seen or been trained using a small number or labeled images or observations will have a difficult time accurately detecting and classifying features in input images.

However, manually labeling or annotating a large number of observations can be expensive and resource intensive, e.g., because of the high cost of manual labor involved in producing labeled training data for feature or object detection models. For example, to generate labeled images, human labelers or annotators generally sift through images that might or might not contain the features or objects of interest, and then manually draw bounding boxes around the objects. At the time of the filing of this patent application, costs for generating labeled imagery can be on the order of a few cents per example image, which can add up significantly when each class of feature/object may need thousands or tens of thousands of labeled examples to train a feature detection model. Thus, service providers face significant challenges associated with the minimizing the use of manual labor when generating labeled training data (e.g., labeled imagery in the case of feature detection models).

To address these technical challenges, a system 100 of FIG. 1 introduces a capability to provide for bulk review and analysis of labeled imagery for false positive labels to improve the quality of the labeled imagery. This improved labeled imagery can then be used to train a feature/object detection model (or any other machine learning model) to more accurately detect the feature(s)/object(s) of interest in images. In one embodiment, the system 100 provides a user interface or data for generating a user interface to enable a human annotator to view multiple found objects at a time, in such a way that false positives are easily seen by the eye and rejected (e.g., human eyes are generally very good at detecting such outliers). The remainder (e.g., the unrejected images) can be accepted in bulk to rapidly filter the found feature/objects in the images, so that the cost per labeled example can decrease dramatically over conventional approaches.

Figure 2:
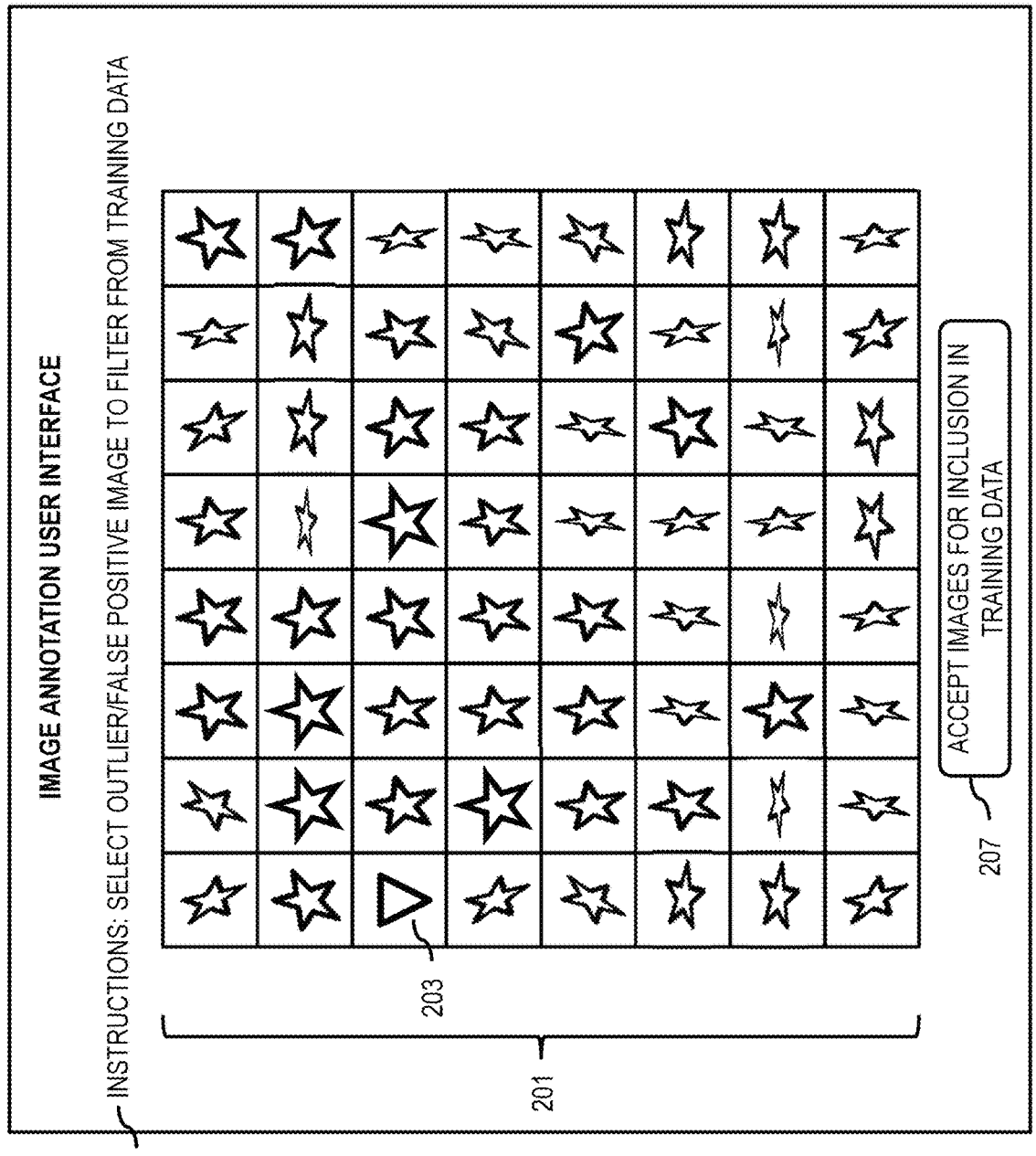
FIG. 2 is a diagram illustrating an example user interface for filtering imagery to train a feature detection model, according to one embodiment.

FIG. 2 is a diagram illustrating an example user interface for filtering imagery to train a feature detection model, according to one embodiment. In the example of FIG. 2, the system 100 is collecting training data to train feature detection model to identify one feature class (e.g., a star logo that can be associated with a point of interest, sign, other vehicles, etc.). The system 100 includes a machine learning system 101 that includes a one or more feature detection models 103a-103n (also collectively referred to as feature detection models 103). In one embodiment, at least one of the feature detection models 103 (e.g., can be an independent feature detection model 103 or an initial or first iteration of the feature detection model 103 that is to be trained) has been trained (e.g., using synthetic or partially synthetic training data) to detect the feature of interest (e.g., the star logo) in images. This initial feature detection model 103 is applied to classify an initial body of images to identify the found features. By way of example, the images can be collected from any source including but not limited to one or more camera-equipped vehicles 105 traveling in a road network. In one embodiment, the images can be collected by a computer vision system 107 over a communication network 109 as a part of a digital map making pipeline to generate a geographic database 111 of the found features/ objects (e.g., location-based features such as, but not limited to, features/objects associated with roads, road furniture, points of interest, other vehicles, buildings, structures, terrain, etc.).

As shown, the system 100 can then present a user interface 200 (e.g., on a computer or other user terminal 113 executing an application 115 used by a human annotator) displaying a bulk arrangement 201 of the found or detected feature of interest as depicted in respective images. In this example, the bulk arrangement 201 is an 8×8 grid with each grid cell displaying a different image of a found feature. In one embodiment, the bulk arrangement 201 can sort or present the found features in an order based on detection confidence of the found feature in each image. For example, the bulk arrangement 201 can order the found features in descending order based on each found feature's detection confidence. In this way, the found feature in the top left corner of the bulk arrangement 201 has the highest detection confidence with the order descending left to right and then top to bottom so that the found feature with the least detection confidence in the group is displayed in the lower right most grid cell. This bulk arrangement 201 enables a human annotator to rapidly identify an outlier image 203. The outlier image 203 that actually depicts a triangle even though the initial feature detection model 103 classified it as depicting the feature of interest. This means that the outlier image 203 is a false positive detection by the initial feature detection model 103.

In this example, the user interface 200 presents an instruction 205 to instruct the human annotator to "select the outlier image/false positive image to filter from training data." Therefore, by selecting the outlier image 203, the human labeler can exclude the outlier image 203 from the training data set. The bulk arrangement 201 enables the human annotator to quickly scan the remaining images for differences. If no other outliers are found, the human annotator can select the option 207 to accept the remaining or unselected images for inclusion in the training data set. As shown in this example, by advantage of the bulk arrangement 201, the human annotator can review 64 images (based on the 8×8 image grid) and accept 63 of the images simply by selecting the outlier image 203 and then the accept option 207. Because the bulk arrangement 201 is sorted based on detection confidence in one embodiment, the occurrence of false positives generally will be relatively few so that any outliers or false positives will be more easily and quickly identifiable by a human annotator.

The approach of the various embodiments described herein provide for several advantages including but not limited to: (1) the use of the bulk arrangement of found features for annotation lowers the cost of producing labeled training data; (2) the further filtering of image data after initial classification prevents the feature detection model 103 from choosing incorrect examples for inclusion in the training data which could lead to a collapse of training data quality; and (3) the use of human annotators after initial classification of the images enables valid but non-obvious variants of the features/objects to be admitted by humans, rather than rejected for being too different. For example, in one implementation, the feature detection model 103 can be used to identify corporate logos or signs in image data. Typically, such logos tend to be invariant. However, unexpected variants can arise for a number of reasons including, but not limited to, constructing the logos out of neon lights, on waving flags, retro versions, seasonal variations, weathering, etc.

Although the various embodiments described herein are discussed with respect to presenting the bulk arrangement of found features in a user interface for manual verification or annotation, it is contemplated that in one embodiment, the system 100 can use another trained model 103 (e.g., trained to detect image outliers) to detect false positives. This embodiment of the image filtering process can then be performed without human intervention to further reduce costs and resources associated with manual verification and labeling.

Figure 3:
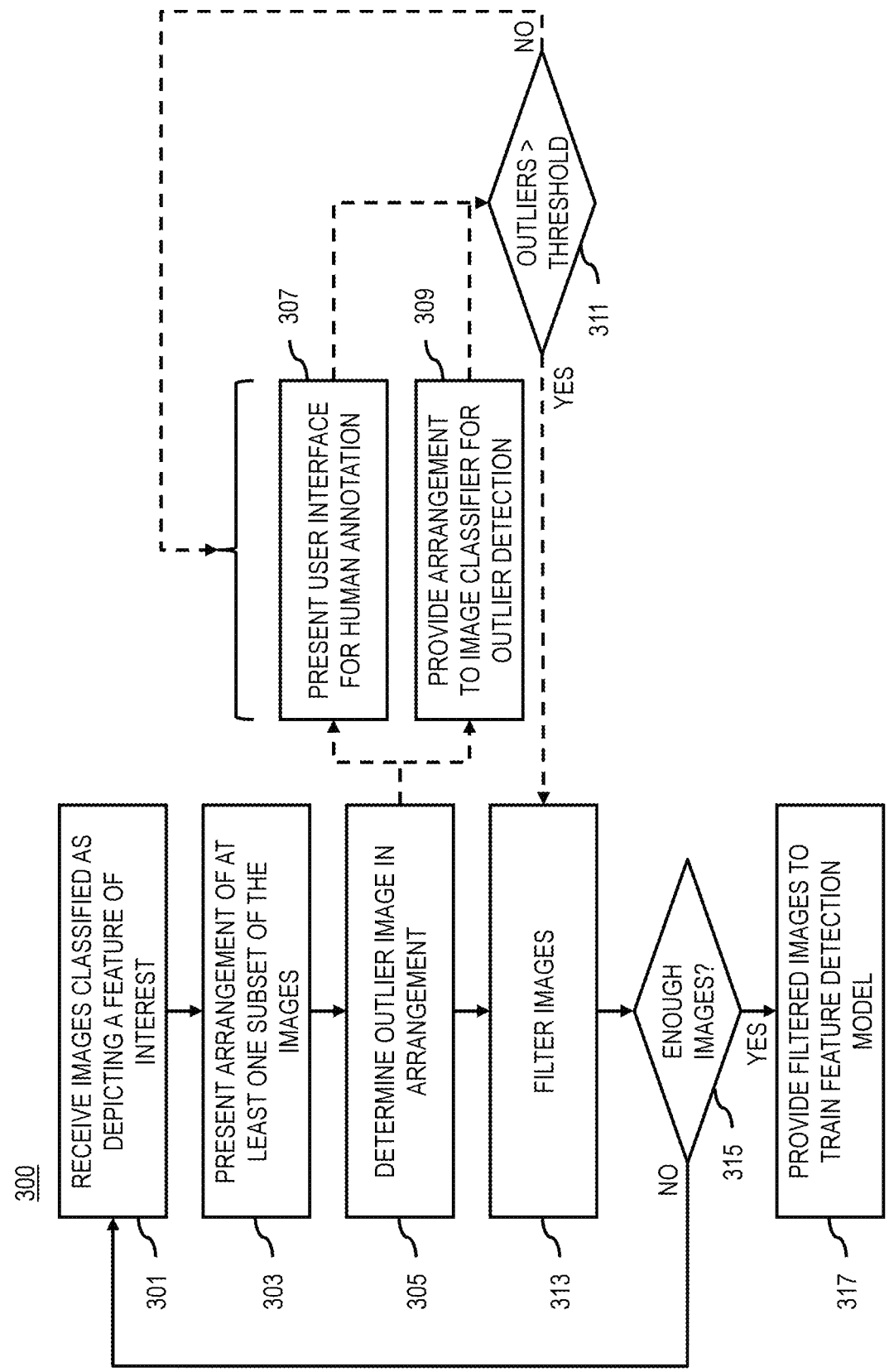
FIG. 3 is a flowchart of a process for filtering imagery to train a feature detection model, according to one embodiment.
Figure 8:
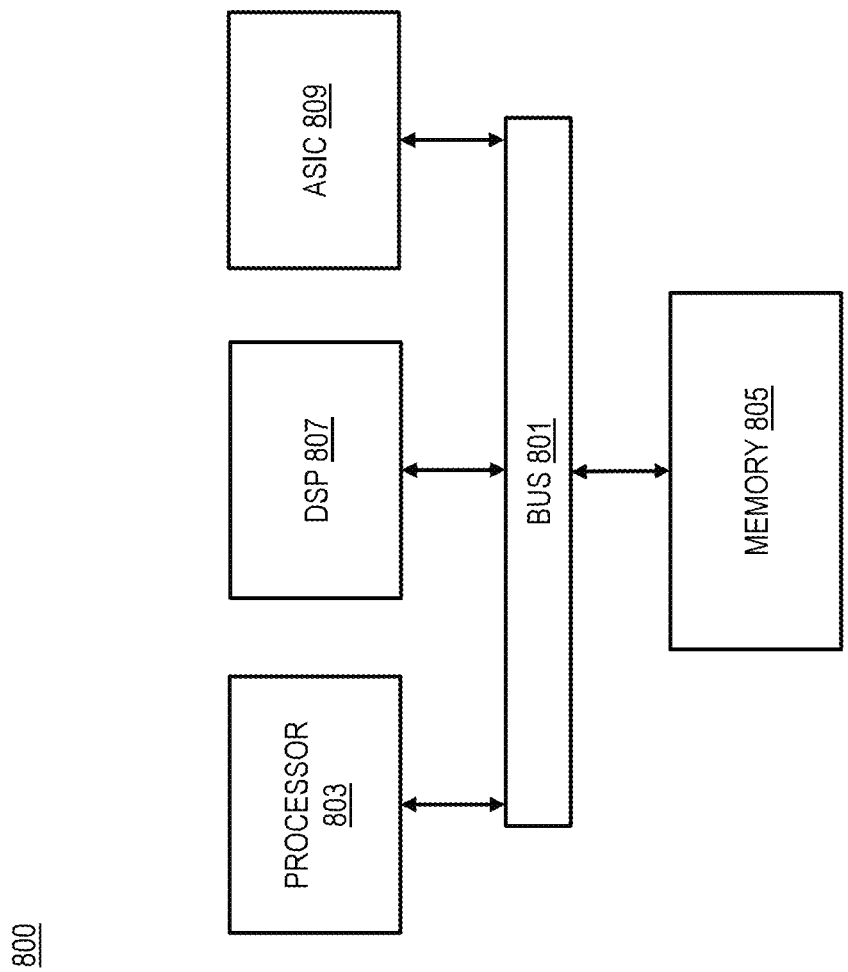
FIG. 8 is a diagram of a chip set that can be used to implement an embodiment of the invention.

FIG. 3 is a flowchart of a process for filtering imagery to train a feature detection model, according to one embodiment. In one embodiment, the machine learning system 101 and/or the computer vision system 107 may perform one or more portions of the process 300 and may be implemented in, for instance, a chip set including a processor and a memory as shown in FIG. 8. As such, the machine learning system 101 and/or the computer vision system 107 can provide means for accomplishing various parts of the process 300. In addition or alternatively, a services platform 117 and/or one or more services 119a-119m (also collectively referred to as services 119) may perform any combination of the steps of the process 300 in combination with the machine learning system 101 and/or the computer vision system 107, or as standalone components. Although the process 300 is illustrated and described as a sequence of steps, it is contemplated that various embodiments of the process 300 may be performed in any order or combination and need not include all of the illustrated steps.

In step 301, the machine learning system 101 receives a plurality of images that have been classified as depicting a feature of interest. In other words, the images have been annotated or labeled to indicate that image depicts the feature. The annotation or labeling includes any means for indicating the found feature or object including but not limited to tagging the image with a label, indicating the feature as a bounding box in the image, and/or the like. In one embodiment, the classification of the images can be performed using any means including but not limited to classification by an initial feature detection model. In one embodiment, the received images are generated as part of process for rapidly collecting training data based on placing synthetic examples of features/objects into existing images, and then training a feature detection model to detect the feature using the synthetic examples.

FIG. 4 is a flowchart of an example machine learning pipeline that uses synthetic imagery, according to one embodiment. As with the process 300 of FIG. 3, the machine learning system 101 alone or in combination with the computer vision system 107 can perform one or more steps of the process 400. Although the process 400 is illustrated and described as a sequence of steps, it is contemplated that various embodiments of the process 400 may be performed in any order or combination and need not include all of the illustrated steps.

In step 401, the machine learning system 101 is given an "exemplar" image(s) of the feature or object to be discovered. As used herein, an exemplar image is any known or labeled image of the feature that can be insert into other images to create a synthetic image of the feature. Synthetic refers to the image having the feature or object artificially place or inserted into an image that originally does not depict the feature or object. To facilitate the insertion into other images, the exemplar image can be (but is not limited to) an isolated depiction of the feature or object with nothing else pictured (e.g., no background, no other features or objects, etc.). For example, if the feature or object is a corporate logo, the exemplar image is an isolated image of the corporate logo with no other features or background depicted. In embodiments in which the exemplar image is not an isolated image of the feature or object, the machine learning system 101 can initiate any available processing technique to blend the exemplar image into other images.

In step 403, after obtaining the exemplar image, the machine learning system 101 can create a body of images containing the exemplar image placed randomly on them. For example, the machine learning system 101 can introduce small perturbations (e.g., changes in size, rotation, color, etc.) to each image. In other words, the machine learning system 101 creates a body of synthetic images from the exemplar image such that each synthetic image is known or otherwise labeled as a ground truth depiction of the feature or object of interest.

The machine learning system 101 trains an feature/object detection model (e.g., a feature detection model 103) to detect the synthetic objects placed in these images (step 405), and then applies the trained feature detection model 103 to a larger and different body of images where the features or objects are likely to be found (step 407). For example, the trained feature detection model 103 ingests this different body of images to extract relevant feature data to predict or classify whether one or more of the images contain the feature or object of interest. In one embodiment, the trained feature detection model 103 can output a bounding box around the feature in a corresponding image, label the bound box with the feature or object of interest, and calculate detection confidence data for the images. The detection confidence data, for instance, includes a calculated confidence indicating the probability determined by the feature detection model 103 that an image depicts a feature or object of interest. Generally, the detection confidence is a range from 0.00, indicating that there is no probability that the image depicts the feature or object, to 1.00, indicating absolute certainty that the image depicts the feature or object. When classifying the body of images, the trained feature detection typically uses a threshold detection confidence to determine whether an image should be classified as having a found feature or object. For example, if the detection confidence is greater than a threshold of 0.75, then an image will be classified as having a found feature or object. If the detection confidence is below the threshold, then the image will be classified as not having a found feature or object.

In step 409, the machine learning system 101 can add the discoveries to the body of images to present. In one embodiment, the machine learning system 101 simply accumulate all found features/objects to add to the body of images to be presented and processed regardless of detection confidence. Alternatively, the machine learning system 101 can optionally take only high-confidence discoveries (e.g., scores above 0.85 or some other threshold) and add them to the body of images. These high confidence detections represent detections of real features or objects as opposed to the synthetic features or objects used in the initial training data set or body of images. In one embodiment, as the collection of real objects increases (e.g., based on detections in non-synthetic images), the machine learning system 101 can gradually remove the synthetic examples from the body of images (e.g., a 1 to 1 substitution in which one synthetic example is remove for each real example added to the body of images) (step 411).

In step 413, the machine learning system 101 can determine whether the number of real examples meets a threshold value. If there are not enough real images to meet the threshold, the machine learning system 101 can repeat the process 300 starting from Step 405 (e.g., training the feature detection model 103) until the number of real examples accumulated is enough to train a final model (step 415). The threshold of the number of images can be based on a target accuracy of the final feature detection model 103 or other criteria specified by a system administrator, end user, etc.

Returning to the step 301 of the process 300 describing the embodiments for filtering imagery, in one embodiment, the process 300 can a modification of the process 400 described above or used as a standalone process. When used as a modification to process 400, the process 300 of FIG. 3 can be used as replacement of the step 409 of FIG. 4. In other words, rather than blind acceptance of discoveries, the process 300 provides for additional filtering or evaluation of outliers/false positives. In one embodiment, the process 300 involves a human to reject the infrequent but often inevitable high-confidence detection errors. Accordingly, the plurality of images received by the machine learning system 101 in step 301 are the body of images generated in step 407 of the process 400. Similarly, the initial feature detection model 103 of step 301 is also the feature detection model 103 trained in the step 405 using the synthetic examples as part of its training data set.

Once step 407 of process 400 is complete and the body of images has been classified by the initial feature detection model 103, the machine learning system 101 can prepare found features/objects in the body of images for bulk presentation. For example, in step 303, the machine learning system 101 provides data for presenting a bulk arrangement of at least one subset of the plurality of images (e.g., the body of images received from the feature detection model 103 of the step 405 of the process 400). In one embodiment, the subset includes multiple images (e.g., at least two images) of the received body of images. The bulk arrangement, for instance, is based on a characteristic of the plurality of images. In other words, the arrangement can be based on a sequence or order of the subset of images that depend on a characteristic of the images. In one embodiment, the bulk arrangement can be based on feature detection confidence data associated with the plurality of images. The feature detection confidence data, for instance, is determined by the initial feature detection model that classified the received body of images. In addition or alternatively, the bulk arrangement can be based on other characteristics of the images or found features including, but not limited to, a position, a size, a color, a perspective, lighting, etc. of found feature/object in its corresponding image. The bulk arrangement can then sort and present the at least one subset of the plurality of images in an order based on respective characteristics (e.g., feature detection confidence values indicated in the feature detection confidence data, position, size, color, perspective, lighting, etc.).

In step 305, the machine learning system 101 determines one or more outlier images or false positive detections of the feature of interest based on the bulk arrangement. In other words, the machine learning system 101 can present the bulk arrangement to determine outlier images (e.g., false positive detections of the feature/object of interest). In one embodiment, the outlier images can be determined using a manual annotation process (step 307) or an automated annotation process (step 309).

Under the manual or human annotation process (step 307), the machine learning system 101 can notify a human and begins using an online tool (e.g., via application 115 of the user terminal 113). The tool, for instance, can use the data provided by the machine learning system 101 for rendering the found features/objects in the received body of images in a user interface for display to the human annotator. The tool (e.g., application 115 or equivalent) presents discoveries of candidate examples of the feature/object in a bulk arrangement (e.g., 64 found features at a time in an 8×8 grid) sorted and presented based on a characteristic of the found features or images. In this way, the machine learning system 100 can present or provide data for presenting the bulk arrangement in a user interface of a device (e.g., user terminal 113).

Figure 5A:
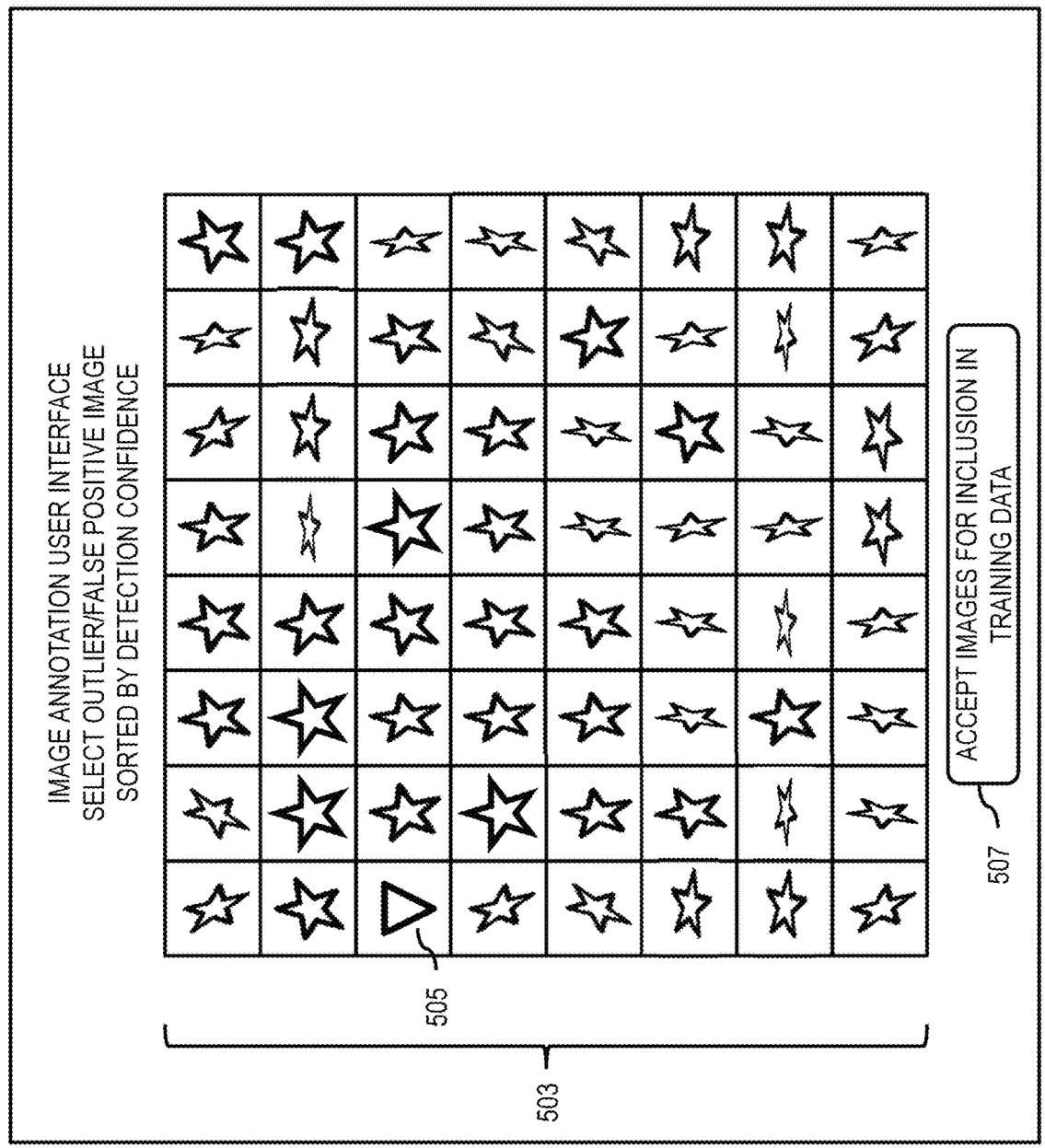
FIGS. 5A-5F are diagrams of example user interfaces for presenting imagery for filtering, according to various embodiments.
Figure 5B:
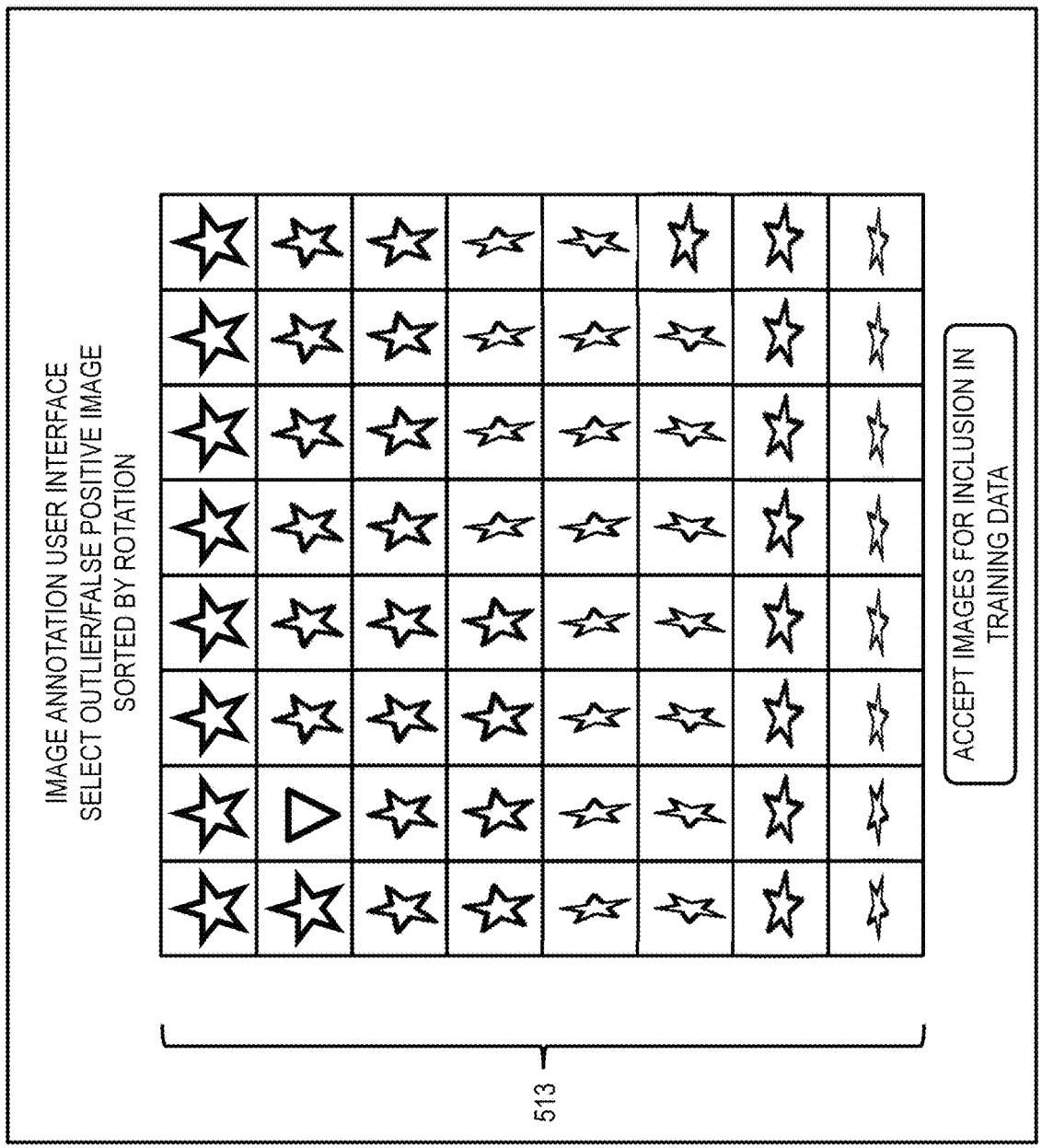
Figure 5C:
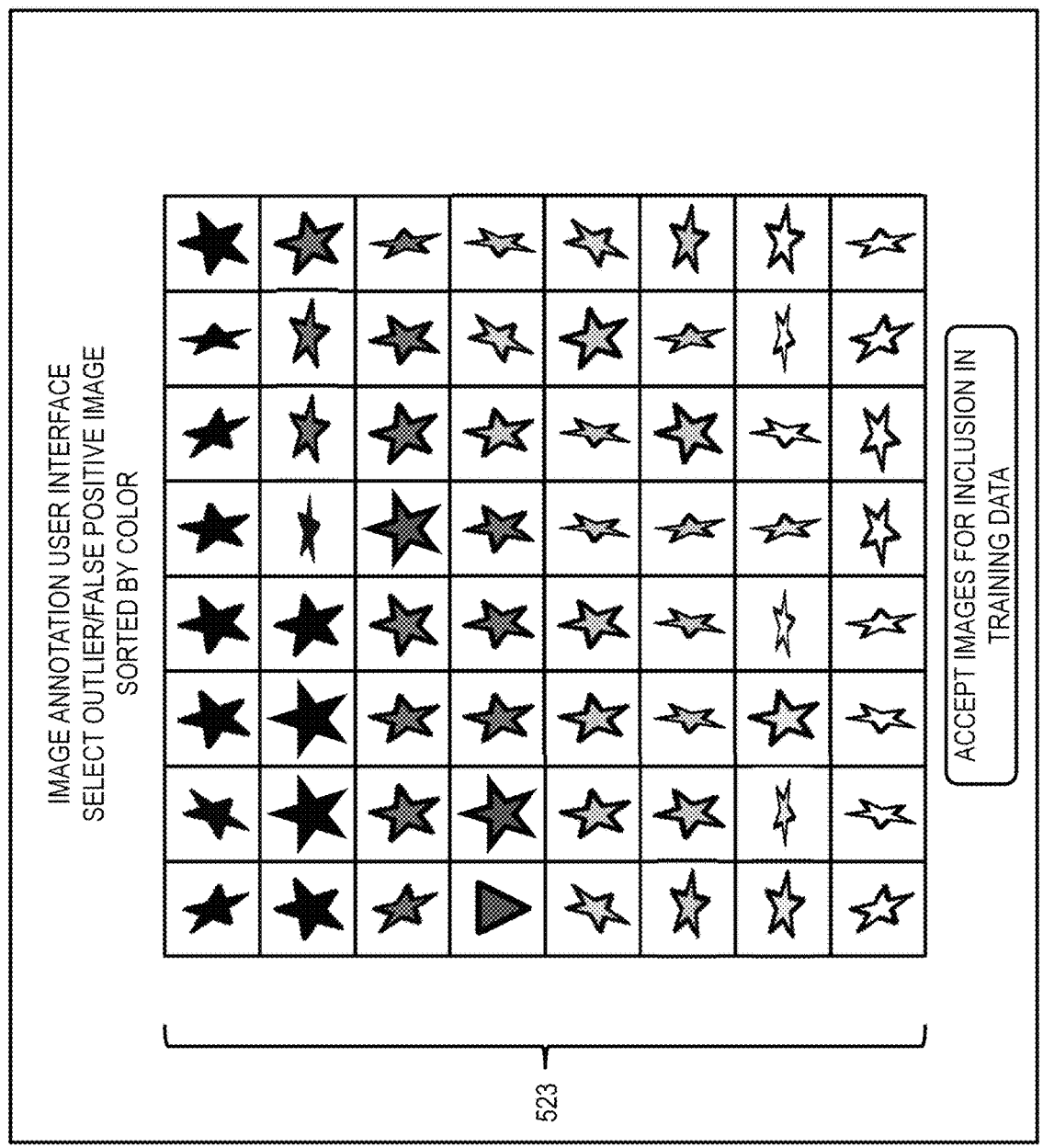

FIGS. 5A-5C illustrate example user interfaces presenting the bulk arrangement sorted according to different characteristics, according to various embodiments. FIG. 5A illustrates an example user interface 501 that presents a bulk arrangement 503 in which the found features are sorted and presented according to the detection confidence of the found features/objects. More specifically, the bulk arrangement 503 presents the found features in descending order of confidence. So, at first all (or nearly all) examples presented in the bulk arrangement are likely to be correct. With so many nearly identical items (e.g., star logos) laid out together in the bulk arrangement 503, the bulk arrangement 503 forms a visually repeating pattern where outliers (e.g., false positive errors) will stand out to the human annotator. In one embodiment, to emphasize the visually repeating pattern, the visual representations of the found features in the bulk arrangement or user interface can be normalized. For example, the machine learning system 101 can process the at least one subset to normalize a size, a position, a visual characteristic, or a combination thereof of the feature of interest in the plurality of images. Normalizing, for instance, refers to rendering found features at a consistent or designated size, position, visual characteristic (e.g., color, contrast, brightness, etc.), etc. in a corresponding grid cell to facilitate identification of false positive detections. The bulk arrangement then is used to present the normalized plurality of images.

Using an input device (e.g., mouse/cursor, touch input, etc.), the human annotator manually rejects the outliers or errors individually (e.g., by selecting the outlier). In one embodiment, the incorrect or selected examples (e.g., selected as outliers) can be removed from the bulk arrangement 503 (or otherwise highlighted to indicate that the outlier has been rejected such as by striking through, ghosting, and/or any other equivalent indication of rejection). In one embodiment, the removed examples can be replaced by blanks space or by a new candidate, depending on the implementation.

After removing incorrect candidates (e.g., outlier image 505), only correct candidates will remain in the bulk arrangement 503. At that point, the human annotator clicks on the accept images option button 507, which admits all onscreen examples into the set of training data (e.g., that will be used for the next iteration of training data collection or for training the final feature detection model 103 if enough example or images are collected to meet a target threshold). Removing the incorrect candidates also effectively removes the selected candidates from the body of images or found features that are to be used to train a feature detection model 103. Thus, if one candidate (e.g., outlier image 505) in the 8×8 grid of the bulk arrangement 503 is incorrect, one mouse click (or other selection method) will reject outlier image 505 and a second click (e.g., click on the accept option 507) will add the remaining 63 examples to the training data set, all of which would take approximately 2-3 seconds. This translates to about 20-30 labeled examples per second.

As work progresses, candidates with lower and lower detection confidence scores are presented in the bulk arrangement 503 (e.g., 64 examples at a time or any other number of images depending on the configuration of the bulk arrangement 503), meaning more and more false positives may also be presented. In one embodiment, in step 311, the machine learning system 101 can monitor the number of outliers to determine whether the number has reached a threshold value. It is contemplated that the number of outliers can be counted per training data round, per annotation session, per body of images, per instance of the bulk arrangement (e.g., per page), and/or per any other example segmentation scheme.

Although the various embodiments are described with respect to presenting the bulk arrangement based on a detection confidence, it is contemplated that the bulk arrangement can be based on any other characteristics of the found features or images alone or in combination with the detection confidence. For example, FIG. 5B illustrates a user interface 511 that displays a bulk arrangement 513 of candidate examples that have been sorted based on the degree of rotation of the feature or object relative to a zero-rotation version of the feature. By ordering the examples based on a rotation of the found features, the bulk arrangement 513 can make it easier for the human annotator to identify differences in rotation that may affect classification accuracy. FIG. 5C illustrates a user interface 521 that displays a bulk arrangement 523 based on a color of the found features. Similar to the rotation example above, ordering the examples by color in the bulk arrangement 523 can make it easier for the human annotator to identify differences in color that may affect classification accuracy. The above examples of sorting characteristics are provided by way of illustration and not as limitations. As noted, any characteristic can be used for sorting and presenting candidate examples.

Figure 5D:
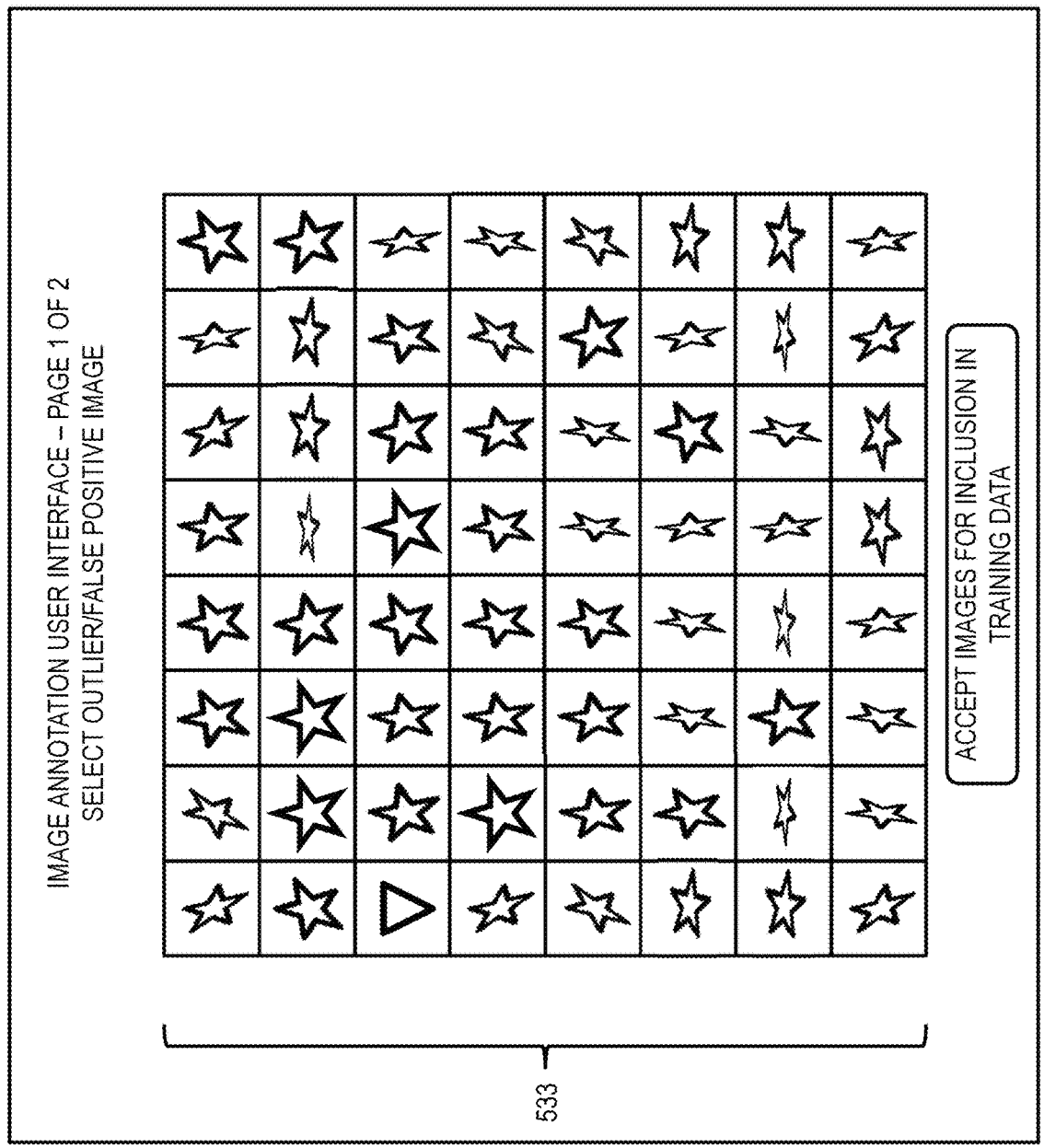
Figure 5E:
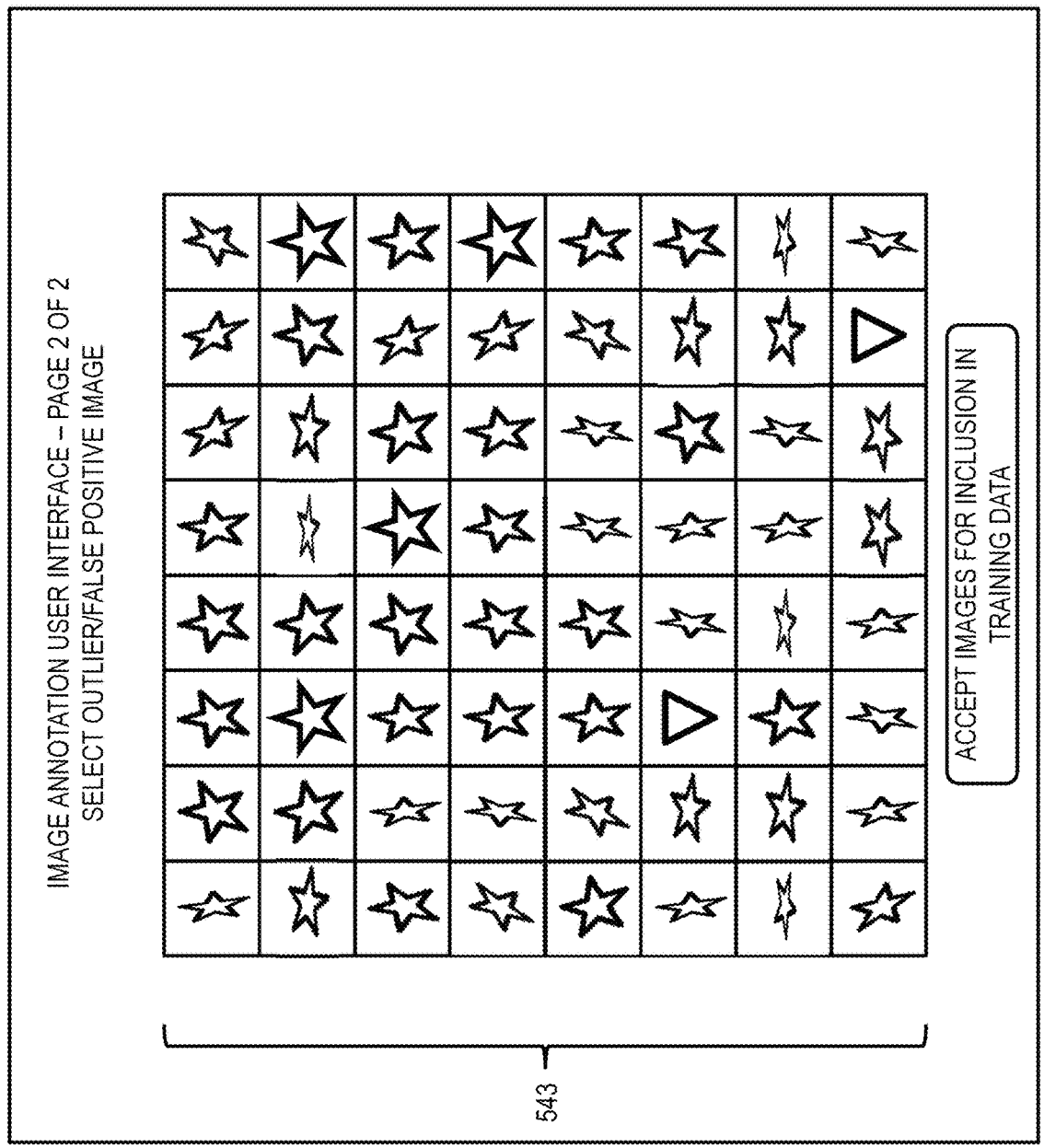

In addition, the bulk arrangements described above are based on a grid with a designated number of images (e.g., 8×8 grid corresponding to 64 images) that are shown at a time. To show more than 64 images, the machine learning system 101 can present multiple pages of the grid as shown in FIGS. 5D and 5E. In the example of FIGS. 5D and 5E, the machine learning system 101 has a total of 128 examples to display. These 128 examples can be broken up into two pages of 8×8 grids. FIG. 5D illustrates a user interface 531 that displays a bulk arrangement 533 of the first 64 examples (e.g., ordered by detection confidence) in a first page (e.g., page 1 of 2), and FIG. 5E illustrates a user interface 541 that displays a bulk arrangement 543 of the second 64 examples in a second page. It is noted that the number of pages as well as the grid size is provided by way of illustration and not as limitations. For example, the machine learning system 101 can use any grid size. A smaller grid size (e.g., 4×4, 3×3, etc.) can reduce the speed of annotation as well the number of near identical examples available to visually identify outliers; while a larger grid size (e.g., 10×10, 11×11, etc.) can increase the number of examples that can be processed at once while potentially causing increased cognitive loads.

Figure 5F:
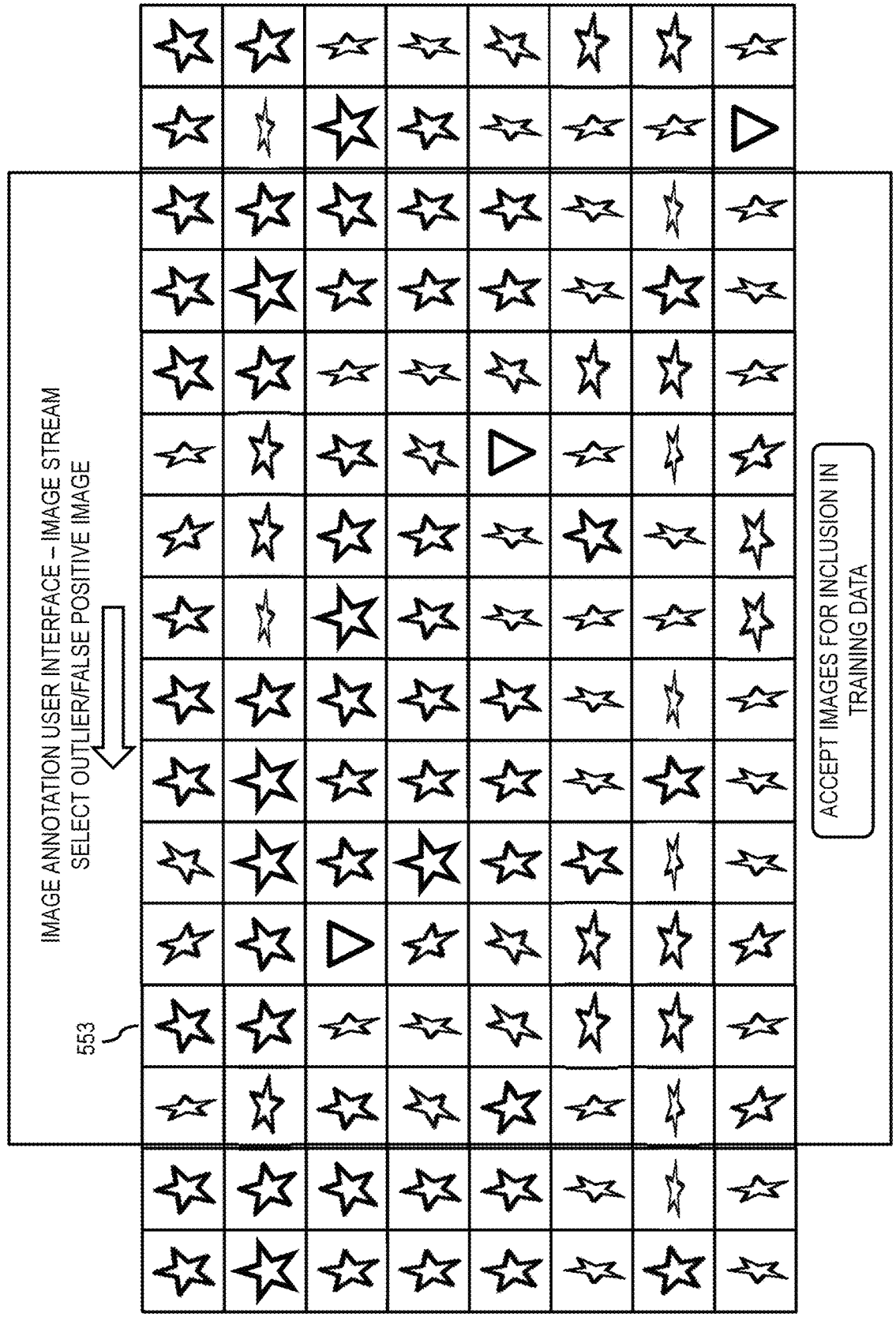

In addition or alternatively, the machine learning system 101 can use a streaming based bulk-representation of the found features. FIG. 5F illustrates a user interface 551 that displays a bulk arrangement 553 that streams the found features of the body images as one continuously scrolling grid of examples (e.g., scrolling from right to left so that earlier examples are streamed off the left side of the user interface 551 as new examples are streamed in from the right side of the user interface 551 in a virtual "conveyor belt" of examples). The scrolling or streaming speed can be adjusted based on the individual human annotator, a desired annotation speed, and/or the like. Again, this streaming example is provided by way of illustration and not as a limitation, it is contemplated that that the representation of a bulk arrangement can take any form, shape, number, etc. that is supported by the user interface of the application 115 and/or user terminal 113 executing the application 115 (e.g., including but not limited to two-dimensional, three-dimensional, virtual reality, augmented reality, etc. representations).

The embodiments described above are discussed with respect to determining outliers using a human-assisted process (e.g., via presentation of the bulk arrangement of found features in a user interface for selection/verification). However, it is also contemplated that the outliers or false positives in the body or images can in addition or alternatively be determined using a fully automated processing pipeline. For example, in step 309, instead of presenting the bulk arrangement of manual annotation, the machine learning system 101 processes the at least one subset of the plurality of images using an image classifier trained to detect at least one outlier image from among the at least one subset (e.g., another feature detection model 103 specifically trained to identify image outliers or false positives within a set of images). This images classifier can be trained using ground truth data that labels various sets of image outliers among a corresponding group of non-outlier images. The number of images can in a group can correspond, for instance, to the grid sizes discussed with respect to the human annotation embodiments of step 307. Similarly, the grouping of the ground truth data can be based on similar characteristics such as, but not limited to, detection confidence, position, size, color, etc. Then any found feature or image that is classified as an outlier can be excluded from the body of images comprising the training data set.

As with the manual annotation approach, the machine learning system 101 can also monitor the number of false positives detected by the image classifier. Accordingly, in step 311, the machine learning system 101 checks whether the number of outliers or false positives is above a threshold value and continues to check for additional outliers if the threshold has not been reached. If the number of detected outliers reaches a threshold, the machine learning system 101 can terminate the automated outlier detection based on determining that a number of the false positive detection observed in the bulk arrangement is above a threshold.

In summary, for either the manual (step 307) or automated (step 309) approach to outlier detection, once enough false positives are seen, the round of training data set creation can end. In one embodiment, this can be done programmatically, when the discard rate is high enough (e.g., above the designated threshold). In another embodiment, the decision to end the training data set round can be at the discretion of the human annotator or human administrator of the outlier image classifier. For example, the human can select an option to indicate to the machine learning system 101 that there are "Too many errors here, I'm done" to end the filtering round. In either the programmatic or manual approach, the machine learning system 101 can employ a heuristic to end work when 20-25% of the candidates in a bulk arrangement are errors (e.g., false positives). In step 313, the machine learning system 101 filters the body of images based on the outlier detection (e.g., manual outlier selection and/or outlier detection using an image classifier). In one embodiment, the filtering will include only those examples of found features specifically admitted in the training data set. Thus, on the terminating of the displaying or presenting of the bulk arrangement to end a filtering round, the machine learning system 101 effectively excludes the portion of the plurality of images that has not been presented in the bulk arrangement from the training data.

In one embodiment, the machine learning system 101 performs the filtering process iteratively until a target detection model quality (e.g., indicated by model accuracy or other equivalent metric) is achieved, until there are no more images to process, until the rate of improvements in accuracy decreases below a threshold (e.g., indicating that additional examples are not resulting in further improvements or where the improvements are marginal). In other words, as indicated in step 315, the machine learning system 101 determines whether there are enough images in the training data set (e.g., the number of images is meets or exceeds a target threshold) to trigger training of the final feature detection model 103. If there are not enough images, the machine learning system 101 retrains the feature detection model using the available training data and returns to step 301 to iteratively classify a subsequent plurality of images as depicting the feature of interest using the retrain feature detection model. The new round of images depicting found features can then be presented a subsequent or other bulk arrangement of the subsequent plurality of images to supplement the training data. The machine learning system 101 can then continue the iterative process and initiate another retraining of the feature detection model using the supplemented training data if it still does not meet target criteria. The retrained feature detection model can be used to classify the previously classified images and/or additional images.

The classifying of the subsequent plurality of images and the presenting of the bulk arrangement of the subsequent plurality of images are performed iteratively until a target number of images in the supplemented training data and/or a target model accuracy is reached. It is noted that in most cases it is not necessary to inspect every possible example in a filter round, since whatever examples are allowed or admitted as training data in one iteration of the process will improve the feature detection model 103 in the next iteration. So, the low-scoring true positives that were not inspected in a filtering round (e.g., because the round was ended with the number or rate of false positives exceeded the threshold) should have higher scores in the next round because the higher quality training data used to train the feature detection model 103 for that round. Thus, successive rounds will have more correct examples pushed to the front of the process (e.g., be presented earlier in the bulk arrangement when the arrangement is ordered based on detection confidence).

In step 317, the machine learning system 101 provides the filtered plurality of images as training data to train the feature detection model. For example, the machine learning system 101 can incorporate a supervised learning model (e.g., a logistic regression model, Random Forest model, and/or any equivalent model) to provide feature matching probabilities that are learned from the training data set. During training, the machine learning system 101 can use a learner module that feeds feature sets from the training data set into the machine learning model to compute a predicted matching feature using an initial set of model parameters. The learner module then compares the predicted matching probability and the predicted feature to the ground truth data (e.g., the manually annotated feature labels) in the training data set for each observation (e.g., image) used for training. The learner module then computes an accuracy of the predictions for the initial set of model parameters. If the accuracy or level of performance does not meet a threshold or configured level, the learner module incrementally adjusts the model parameters until the model generates predictions at a desired or configured level of accuracy with respect to the manually annotated labels in the training data (e.g., the ground truth data). In other words, a "trained" feature prediction model is a classifier with model parameters adjusted to make accurate predictions with respect to the training data set.

In one embodiment, the trained feature detection model can be used for a range of services and applications depending on accurate feature detection. For example, machine learning using feature detection models 103 (e.g., identifying objects or features in images) enable a range of new services and functions including for applications such as autonomous driving. For example, with respect to autonomous driving, computer vision and computing power supporting feature detection and other related machine learning techniques have enabled real-time mapping and sensing of a vehicle's environment. Such an understanding of the environment enables autonomous, semi-autonomous, or highly assisted driving in a vehicle (e.g., a vehicle 105) in at least two distinct ways.

First, real-time sensing of the environment provides information about potential obstacles, the behavior of others on the road, and safe, drivable areas. An understanding of where other cars are and what they might do is critical for a vehicle 105 to safely plan a route. Moreover, vehicles 105 generally must avoid both static (lamp posts, e.g.) and dynamic (cats, deer, e.g.) obstacles, and these obstacles may change or appear in real-time. Thus, detecting such objects in image data collected by the vehicles (e.g., via trained feature detection models 103) can support such functionality. More fundamentally, vehicles 105 can use a semantic understanding of what areas around them are navigable and safe for driving. Even in a situation where the world is completely mapped in high resolution, exceptions will occur in which a vehicle 105 might need to drive off the road to avoid a collision, or where a road's geometry or other map attributes like direction of travel have changed. In this case, detailed mapping may be unavailable, and the vehicle 105 has to navigate using real-time sensing of road features or obstacles using a computer vision system 107 facilitated, for instance, by machine learning processes and feature detection models.

A second application of vision techniques in autonomous driving is localization of the vehicle 105 with respect to a map of reference landmarks. Understanding one's location on a map enables planning of a route, both on fine and coarse scales. On a coarse scale, navigation maps allow vehicles 105 to know what roads to use to reach a particular destination. However, on a finer scale, maps allow vehicles 105 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to a map enables the incorporation of other real-time information into route planning. Such information could include traffic, areas with unsafe driving conditions (ice, fog, potholes, e.g.), and temporary road changes like construction.

With respect to lane localization and also generally with respect to autonomous driving, high accuracy and real-time localization of vehicles 105 are needed. Traditionally, most vehicle navigation system have accomplished this localization using GPS, which generally provides a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 105 (e.g., an autonomous vehicle) so that it can make safe route planning decisions. Other sensors, such as inertial measurement units (IMUS) can increase the accuracy of localization by taking into account vehicle movement, but these sensors tend to drift and still do not provide sufficient accuracy for localization.

In general, a localization accuracy of around 10 cm is needed for safe driving in many areas. One way to achieve this level of accuracy is to use visual odometry, in which features are detected from imagery using feature prediction models 103 (e.g., a machine learning classifier). These features can then be matched to a database of features (e.g., stored in the geographic database 111) to determine one's location. By way of example, traditional feature-based localization that both detect features and localize against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle on different days in different weather conditions. Aside from reproducibility, the ability to detect and store higher level features of different types (e.g., lane features such as lane markings, lane lines, etc.) can provide better and more accurate localization.

In response to these issues, the system 100 of FIG. 1 (e.g., including the machine learning system 101 and/or computer vision system 107) focuses on detecting high level features that have semantic meaning for human beings. One such feature that is important to autonomous driving is the detection of road features (e.g., signs, landmarks, buildings, etc.) and related identifying characteristics (e.g., corporate logos displayed on the signs, landmarks, buildings, etc. to more specifically identify the map features. Other potential features of interest include, but are not limited to, lane features (e.g., lane markings, lane lines, Botts' dots, reflectors, etc.) and corresponding lane models that can be detected in imagery. Lane-level information is important for self-driving applications because it defines the grammar of driving. Without knowledge of lane markings, it can difficult or impossible to determine where a vehicle 105 should drive, can drive, and what maneuvers are possible. As a result, the ability to detect lane-lines in real-time constitutes a fundamental part for the design of an autonomous vehicle 105.

In other words, the success of localization based on features detected from an image can depend on the precise localization of those features within the image and the quality of the technique used to detect the lane features or other similar features. This success, for instance, can depend greatly on how well trained a feature prediction model is. To create a well-trained machine learning or prediction model, the system 100 can use the embodiments described herein to create a high-quality training data set while minimizing associated costs, particularly, costs related to manual annotation.

Returning to FIG. 1, as shown, the system 100 includes the machine learning system 101 for filtering imagery to train a feature prediction model according the various embodiments described herein. In some use cases, the system 100 can include the computer vision system 107 configured to use machine learning to detect objects or features depicted in images. For example, with respect to autonomous, navigation, mapping, and/or other similar applications, the computer vision system 107 can detect road features (e.g., lane lines, signs, etc.) in an input image and generate associated prediction confidence values, according to the various embodiments described herein. In one embodiment, the machine learning system 101 includes a neural network or other equivalent machine learning model (e.g., Support Vector Machines, Random Forest, etc.) to detect features or objects. In one embodiment, the neural network of the machine learning system 101 is a traditional convolutional neural network which consists of multiple layers of collections of one or more neurons (e.g., processing nodes of the neural network) which are configured to process a portion of an input image. In one embodiment, the receptive fields of these collections of neurons (e.g., a receptive layer) can be configured to correspond to the area of an input image delineated by a respective a grid cell generated as described above.

In one embodiment, the machine learning system 101 and/or the computer vision system 107 also have connectivity or access to a geographic database 111 which stores representations of mapped geographic features to compare against or to store features or objects detected according to the embodiments described herein. The geographic database 111 can also store representations of detected features and/or related data generated or used to filter imagery including but not limited to bulk arrangements, detection confidence data, trained models 103, etc.

In one embodiment, the machine learning system 101 and/or computer vision system 107 have connectivity over a communication network 109 to the services platform 117 that provides one or more services 119. By way of example, the services 119 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 119 uses the output of the machine learning system 101 and/or of the computer vision system 107 (e.g., detected lane features) to localize the vehicle 105 or a user terminal 113 (e.g., a portable navigation device, smartphone, portable computer, tablet, etc.) to provide services 119 such as navigation, mapping, other location-based services, etc.

In one embodiment, the machine learning system 101 and/or computer vision system 107 may be a platform with multiple interconnected components. The machine learning system 101 and/or computer vision system 107 may include multiple servers, intelligent networking devices, computing devices, components and corresponding software for providing parametric representations of lane lines. In addition, it is noted that the machine learning system 101 and/or computer vision system 107 may be a separate entity of the system 100, a part of the one or more services 119, a part of the services platform 117, or included within the user terminal 113 and/or vehicle 105.

In one embodiment, content providers 121a-121k (collectively referred to as content providers 121) may provide content or data (e.g., including geographic data, parametric representations of mapped features, etc.) to the geographic database 111, the machine learning system 101, the computer vision system 107, the services platform 117, the services 119, the user terminal 113, the vehicle 105, and/or an application 115 executing on the user terminal 113. The content provided may be any type of content, such as map content, textual content, audio content, video content, image content, etc. In one embodiment, the content providers 121 may provide content that may aid in the detecting and classifying of lane lines and/or other features in image data and estimating the quality of the detected features. In one embodiment, the content providers 121 may also store content associated with the geographic database 111, machine learning system 101, computer vision system 107, services platform 117, services 119, user terminal 113, and/or vehicle 105. In another embodiment, the content providers 121 may manage access to a central repository of data, and offer a consistent, standard interface to data, such as a repository of the geographic database 111.

In one embodiment, the user terminal 113 and/or vehicle 105 may execute a software application 115 to filter and/or collect imagery for filtering to train machine learning models according the embodiments described herein. By way of example, the application 115 may also be any type of application that is executable on the user terminal 113 and/or vehicle 105, such as autonomous driving applications, mapping applications, location-based service applications, navigation applications, content provisioning services, camera/imaging application, media player applications, social networking applications, calendar applications, and the like. In one embodiment, the application 115 may act as a client for the machine learning system 101 and/or computer vision system 107 and perform one or more functions associated with filtering imagery to train a feature detection model alone or in combination with the machine learning system 101.

By way of example, the user terminal 113 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the user terminal 113 can support any type of interface to the user (such as "wearable" circuitry, etc.). In one embodiment, the user terminal 113 may be associated with the vehicle 105 or be a component part of the vehicle 105.

In one embodiment, the user terminal 113 and/or vehicle 105 are configured with various sensors for generating or collecting environmental image data (e.g., for processing by the machine learning system 101 and/or computer vision system 107), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the user terminal 113 and/or vehicle 105 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the user terminal 113 and/or vehicle 105 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the user terminal 113 and/or vehicle 105 may include GPS or other satellite-based receivers to obtain geographic coordinates from satellites 121 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 109 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the machine learning system 101, computer vision system 107, services platform 117, services 119, user terminal 113, vehicle 105, and/or content providers 121 communicate with each other and other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 6:
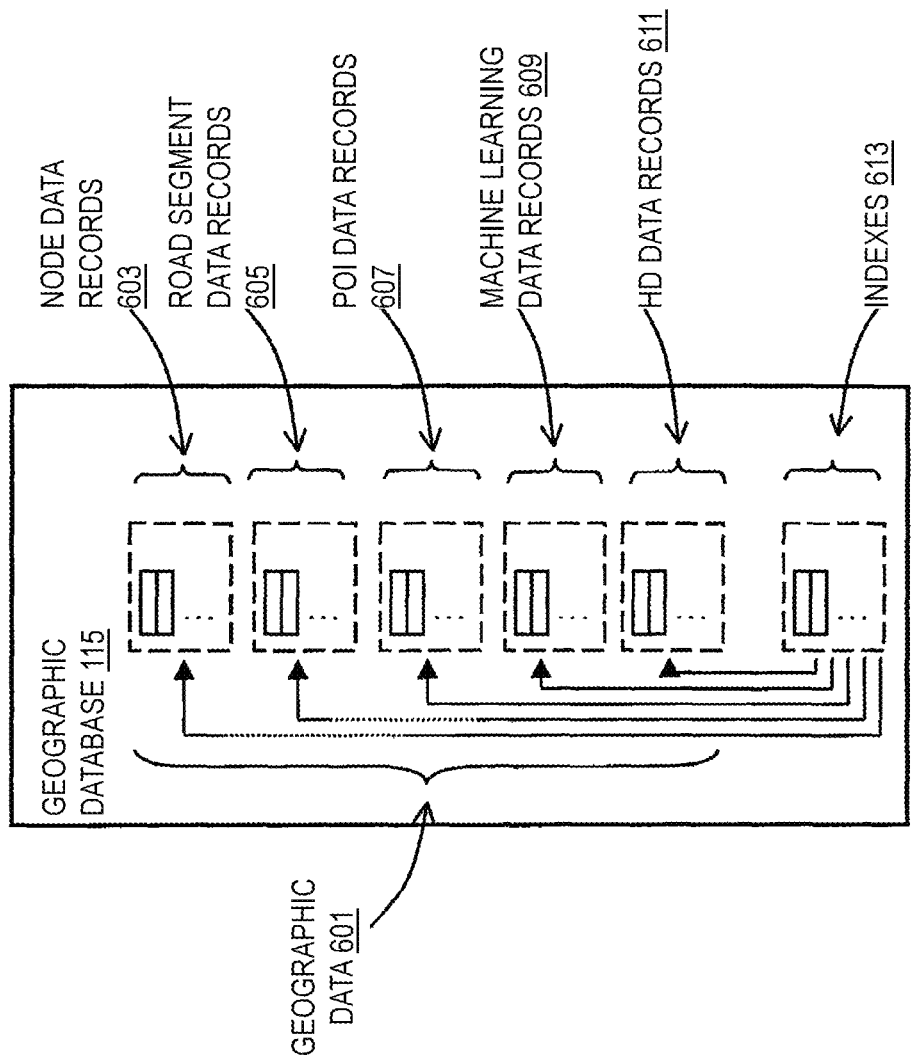
FIG. 6 is a diagram of a geographic database, according to one embodiment.

FIG. 6 is a diagram of a geographic database (such as database 111), according to one embodiment. In one embodiment, the geographic database 111 includes geographic data 601 used for (or configured to be compiled to be used for) mapping and/or navigation-related services, such as for video odometry based on the parametric representation of lanes include, e.g., encoding and/or decoding parametric representations into lane lines. In one embodiment, the geographic database 111 include high resolution or high definition (HD) mapping data that provide centimeter-level or better accuracy of map features. For example, the geographic database 111 can be based on Light Detection and Ranging (LiDAR) or equivalent technology to collect billions of 3D points and model road surfaces and other map features down to the number lanes and their widths. In one embodiment, the HD mapping data (e.g., HD data records 611) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 111.

"Node"—A point that terminates a link.

"Line segment"—A straight line connecting two points.

"Link" (or "edge")—A contiguous, non-branching string of one or more segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 111 follows certain conventions. For example, links do not cross themselves and do not cross each other except at a node. Also, there are no duplicated shape points, nodes, or links. Two links that connect each other have a common node. In the geographic database 111, overlapping geographic features are represented by overlapping polygons. When polygons overlap, the boundary of one polygon crosses the boundary of the other polygon. In the geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 111 includes node data records 603, road segment or link data records 605, POI data records 607, machine learning data records 609, HD mapping data records 611, and indexes 613, for example. More, fewer or different data records can be provided. In one embodiment, additional data records (not shown) can include cartographic ("carto") data records, routing data, and maneuver data. In one embodiment, the indexes 613 may improve the speed of data retrieval operations in the geographic database 111. In one embodiment, the indexes 613 may be used to quickly locate data without having to search every row in the geographic database 111 every time it is accessed. For example, in one embodiment, the indexes 613 can be a spatial index of the polygon points associated with stored feature polygons.

In exemplary embodiments, the road segment data records 605 are links or segments representing roads, streets, or paths, as can be used in the calculated route or recorded route information for determination of one or more personalized routes. The node data records 603 are end points corresponding to the respective links or segments of the road segment data records 605. The road link data records 605 and the node data records 603 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 607. The geographic database 111 can also include data about places, such as cities, towns, or other communities, and other geographic features, such as bodies of water, mountain ranges, etc. Such place or feature data can be part of the POI data records 607 or can be associated with POIs or POI data records 607 (such as a data point used for displaying or representing a position of a city).

In one embodiment, the geographic database 111 can also include machine learning data records 609 for storing training data, prediction models, annotated observations, computed featured distributions, sampling probabilities, and/or any other data generated or used by the system 100 according to the various embodiments described herein. By way of example, the machine learning data records 609 can be associated with one or more of the node records 603, road segment records 605, and/or POI data records 607 to support localization or visual odometry based on the features stored therein and the corresponding estimated quality of the features. In this way, the records 609 can also be associated with or used to classify the characteristics or metadata of the corresponding records 603, 605, and/or 607.

In one embodiment, as discussed above, the HD mapping data records 611 model road surfaces and other map features to centimeter-level or better accuracy. The HD mapping data records 611 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 611 are divided into spatial partitions of varying sizes to provide HD mapping data to vehicles 105 and other end user devices with near real-time speed without overloading the available resources of the vehicles 105 and/or devices (e.g., computational, memory, bandwidth, etc. resources).

In one embodiment, the HD mapping data records 611 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 611.

In one embodiment, the HD mapping data records 611 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 111 can be maintained by the content provider 121 in association with the services platform 117 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle (e.g., vehicle 105 and/or user terminal 113) along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 105 or user terminal 113, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for filtering imagery to train a feature detection model may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
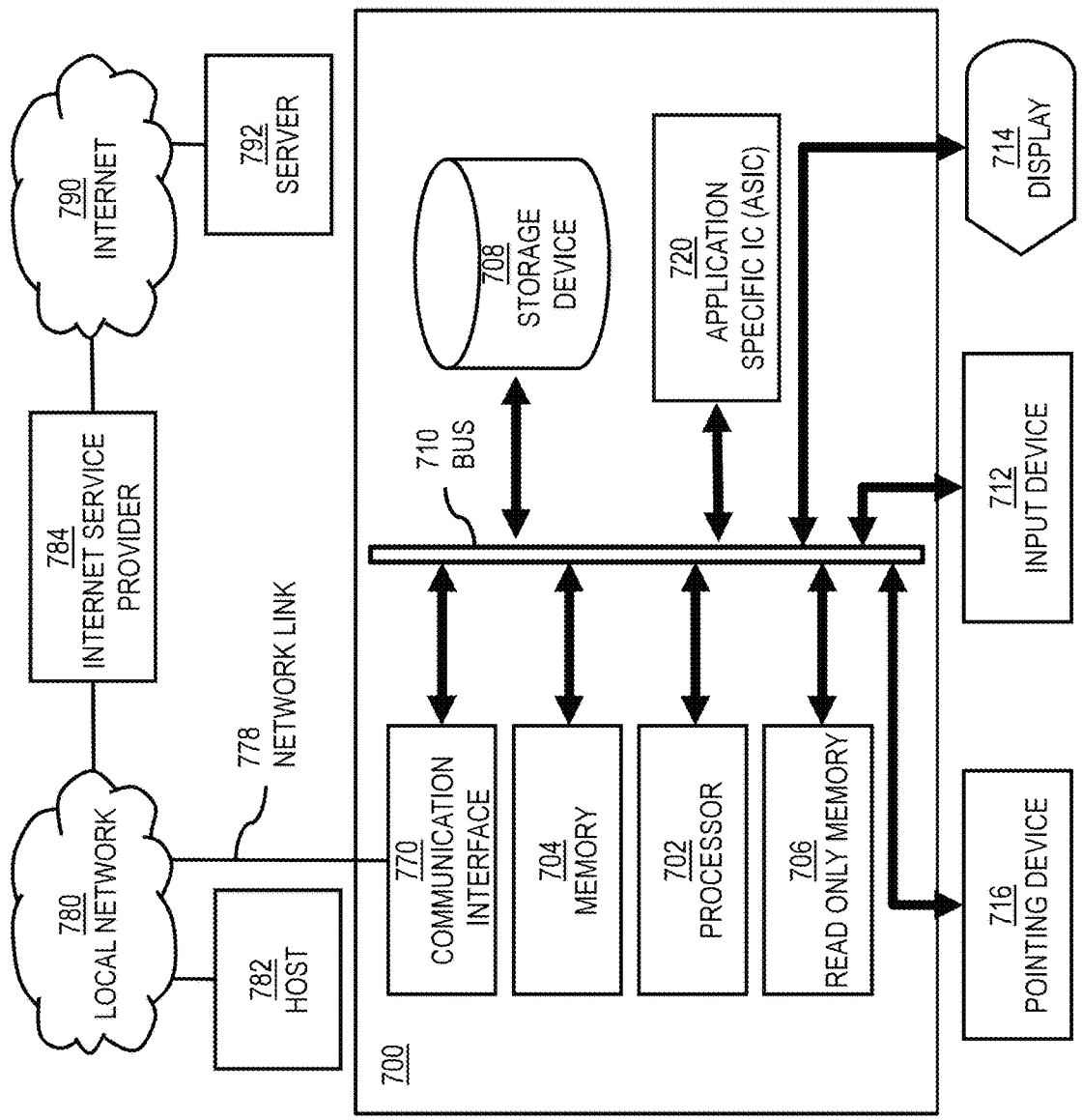
FIG. 7 is a diagram of hardware that can be used to implement an embodiment of the invention.

FIG. 7 illustrates a computer system 700 upon which an embodiment of the invention may be implemented. Computer system 700 is programmed (e.g., via computer program code or instructions) to filter imagery to train a feature detection model as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to filtering imagery to train a feature detection model. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for filtering imagery to train a feature detection model. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for filtering imagery to train a feature detection model, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 109 for filtering imagery to train a feature detection model.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 8 illustrates a chip set 800 upon which an embodiment of the invention may be implemented. Chip set 800 is programmed to filter imagery to train a feature detection model as described herein and includes, for instance, the processor and memory components described with respect to FIG. 7 incorporated in one or more physical packages (e.g., chips). By way of example, a physical package includes a bulk arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to filter imagery to train a feature detection model. The memory 805 also stores the data associated with or generated by the execution of the inventive steps.

Figure 9:
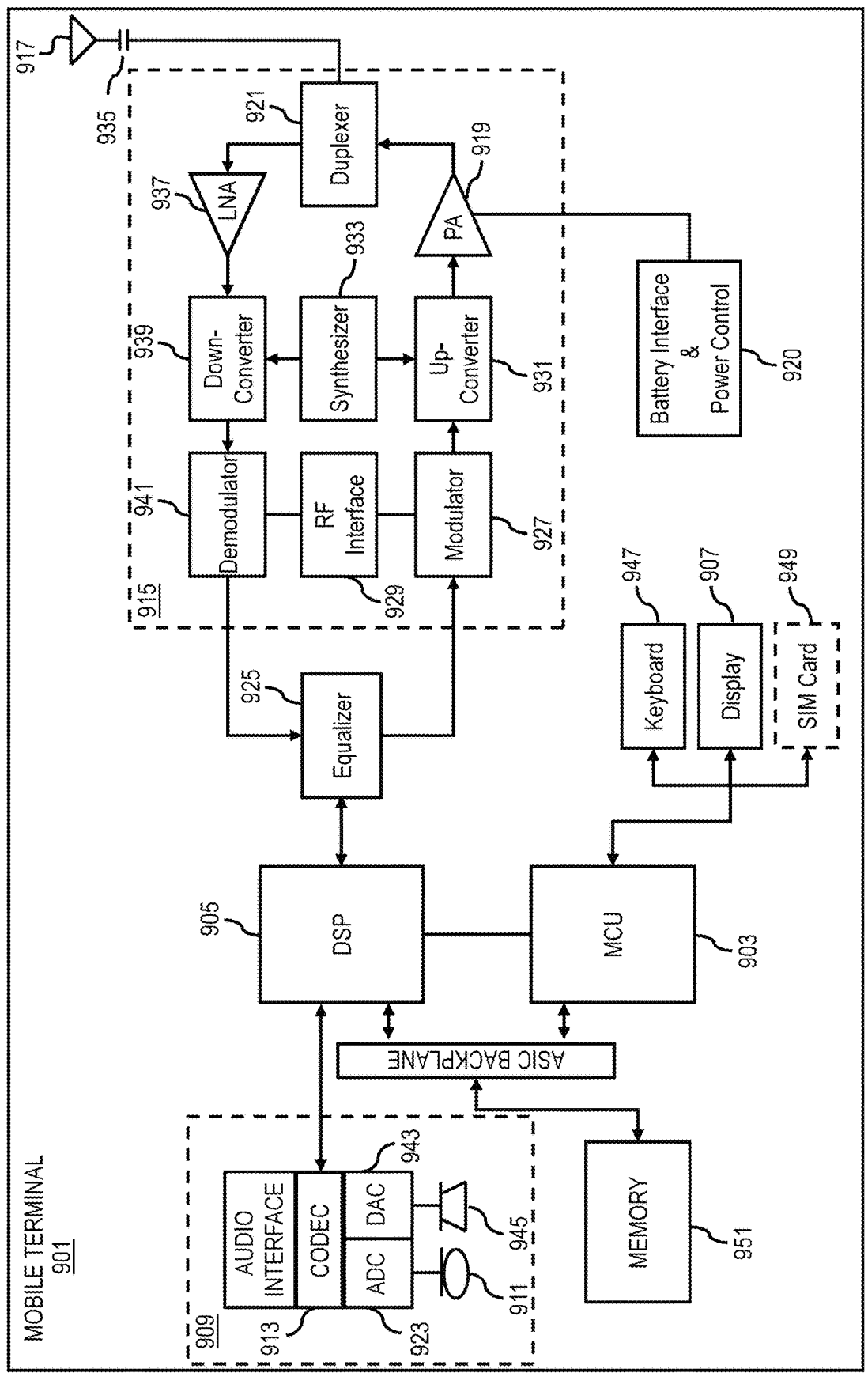
FIG. 9 is a diagram of a mobile terminal that can be used to implement an embodiment of the invention.

FIG. 9 is a diagram of exemplary components of a mobile terminal 901 (e.g., user terminal 113, vehicle 105, and/or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to filter imagery to train a feature detection model. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 951 may be, but not limited to, a single memory, CD, DVD, ROM, RAM, EEPROM, optical storage, or any other non-volatile or non-transitory storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for filtering imagery to train a feature detection model comprising:
receiving a plurality of images, wherein the plurality of images is classified as depicting a feature of interest;
providing data for presenting a bulk arrangement of at least one subset of the plurality of images, wherein the bulk arrangement is based on feature detection confidence data associated with the plurality of images;
processing the at least one subset of the plurality of images using an image classifier trained to detect at least one outlier image from among the at least one subset;
initiating a filtering of the plurality of images based on the bulk arrangement and the at least one outlier image; and
providing the filtered plurality of images as training data to train the feature detection model.

2. The method of claim 1, further comprising:
receiving an input for selecting at least one image in the bulk arrangement,
wherein the filtering of the plurality of images is based on the selected at least one image.

3. The method of claim 1, wherein the bulk arrangement sorts and presents the at least one subset of the plurality of images in an order based on respective feature detection confidence values indicated in the feature detection confidence data.

4. The method of claim 1, wherein the bulk arrangement is a paged-based arrangement presents the plurality of images one page at a time, and wherein the page comprises a predetermined number of images.

5. The method of claim 1, wherein the bulk arrangement is a stream-based arrangement that presents the plurality of images as a continuous stream representation.

6. The method of claim 1, further comprising:
designating the selected at least one images as a false positive detection; and
removing the false positive detection from the plurality of images during the filtering of the plurality of images.

7. The method of claim 6, further comprising:
terminating the displaying of the bulk arrangement, the filtering of the plurality of images, or a combination thereof based on determining that a number of the false positive detection observed in the bulk arrangement is above a threshold.

8. The method of claim 7, further comprising:
on the terminating of the displaying of the bulk arrangement, excluding a portion of the plurality of images that has not been presented from the training data.

9. The method of claim 1, further comprising:
iteratively classifying a subsequent plurality of images as depicting the feature of interest using the feature detection model and presenting a subsequent bulk arrangement of the subsequent plurality of images to supplement the training data; and
initiating a retraining of the feature detection model using the supplemented training data.

10. The method of claim 1, wherein the classifying of the subsequent plurality of images and the presenting of the bulk arrangement of the subsequent plurality of images are performed iteratively until a target number of images in the supplemented training data is reached, a target model accuracy is achieved, or a combination thereof.

11. The method of claim 1, further comprising:
processing the at least one subset to normalize a size, a position, a visual characteristic, or a combination thereof of the feature of interest in the plurality of images,
wherein the bulk arrangement presents the normalized plurality of images.

12. An apparatus for sampling for filtering imagery to train a feature detection model comprising:
at least one processor; and
at least one memory including computer program code for one or more programs,
the at least one memory and the computer program code configured to, with the at least one processor, cause the apparatus to perform at least the following,
receive a plurality of images, wherein the plurality of images is classified as depicting a feature of interest;
provide data for presenting a bulk arrangement of at least one subset of the plurality of images, wherein the bulk arrangement is based on a characteristic of the plurality of images;
process the at least one subset of the plurality of images using an image classifier trained to detect at least one outlier image from among the at least one subset;
initiate a filtering of the plurality of images based on the bulk arrangement and the at least one outlier image; and
provide the filtered plurality of images as training data to train the feature detection model.

13. The apparatus of claim 12, wherein the characteristic is feature detection confidence.

14. The apparatus of claim 12, wherein the apparatus is further caused to:
present the bulk arrangement in a user interface of a device; and
receive an input via the user interface for selecting at least one image in the bulk arrangement,
wherein the filtering of the plurality of images is based on the selected at least one image.

15. A non-transitory computer-readable storage medium for filtering imagery to train a feature detection model, carrying one or more sequences of one or more instructions which, when executed by one or more processors, cause an apparatus to perform:
receiving a plurality of images, wherein the plurality of images is classified as depicting a feature of interest;
providing data for presenting a bulk arrangement of at least one subset of the plurality of images, wherein the bulk arrangement is based on a characteristic of the plurality of images;
processing the at least one subset of the plurality of images using an image classifier trained to detect at least one outlier image from among the at least one subset;
initiating a filtering of the plurality of images based on the bulk arrangement and the at least one outlier image; and
providing the filtered plurality of images as training data to train the feature detection model.

16. The non-transitory computer-readable storage medium of claim 15, wherein the characteristic is feature detection confidence.

17. The non-transitory computer-readable storage medium of claim 15, wherein the apparatus is caused to further perform:
present the bulk arrangement in a user interface of a device; and receive an input via the user interface for selecting at least one image in the bulk arrangement,
wherein the filtering of the plurality of images is based on the selected at least one image.

18. The method of claim 1, further comprising:
determining an exemplar image of the feature of interest;
creating one or more synthetic images based on the exemplar image; and
initiating training of the feature detection model based on the one or more synthetic images.

19. The apparatus of claim 12, wherein the apparatus is further caused to:
determine an exemplar image of the feature of interest;
create one or more synthetic images based on the exemplar image; and
initiate training of the feature detection model based on the one or more synthetic images.

20. The non-transitory computer-readable storage medium of the claim 15, wherein the apparatus is caused to further perform:
determining an exemplar image of the feature of interest;
creating one or more synthetic images based on the exemplar image; and
initiating training of the feature detection model based on the one or more synthetic images.

* * * * *